(12) United States Patent
Wang et al.

(10) Patent No.: US 11,341,371 B2
(45) Date of Patent: May 24, 2022

(54) METHOD, DEVICE AND TERMINAL FOR GENERATING TRAINING DATA

(71) Applicant: CLOUDMINDS (SHANGHAI) ROBOTICS CO., LTD., Shanghai (CN)

(72) Inventors: Kai Wang, Shenzhen (CN); Yibing Nan, Shenzhen (CN); Fuyuan Shi, Shenzhen (CN); Wenqi Wang, Shenzhen (CN); Yimin Lin, Shenzhen (CN); Shiguo Lian, Shenzhen (CN)

(73) Assignee: CLOUDMINDS (SHANGHAI) ROBOTICS CO., LTD., Shanghai (CN)

( * ) Notice: Subject to any disclaimer, the term of this patent is extended or adjusted under 35 U.S.C. 154(b) by 281 days.

(21) Appl. No.: 16/751,254

(22) Filed: Jan. 24, 2020

(65) Prior Publication Data
US 2020/0242409 A1 Jul. 30, 2020

(30) Foreign Application Priority Data

Jan. 29, 2019 (CN) .......................... 201910088005.7

(51) Int. Cl.
G06V 10/00 (2022.01)
G06K 9/62 (2022.01)
(Continued)

(52) U.S. Cl.
CPC .......... G06K 9/6259 (2013.01); G06N 3/0454 (2013.01); G06V 10/28 (2022.01)

(58) Field of Classification Search
CPC ...... G06K 9/6255; G06K 9/66; G06K 9/6216; G06K 9/00228; G06K 9/6407; G06K 9/2009; G06K 9/6423; G06K 9/6476; G06K 9/00084; G06K 9/00718; G06K 9/00797; G06K 9/6259; G06F 17/30249; G06F 17/30257; G06F 17/3024; G06T 7/001; H04N 1/40062
See application file for complete search history.

(56) References Cited

U.S. PATENT DOCUMENTS 9,946,933 B2 * 4/2018 De Souza .......... G06K 9/00718
10,346,723 B2 * 7/2019 Han ........................ G06K 9/52
(Continued)

OTHER PUBLICATIONS

Kai Wang, et al., "Synthetic Data Generation and Adaption for Object Detection in Smart Vending Machines", https://doi.org/10.48550/arXiv.1904.12294, Apr. 28, 2019, 9 pgs.

Primary Examiner — Amir Alavi
(74) Attorney, Agent, or Firm — Schmeiser, Olsen & Watts, LLP

(57) ABSTRACT

A method, a device and a terminal for generating training data is provided. The method for generating training data includes: obtaining an original image; determining a transferred image based on the image style transfer model and the original image, wherein the image style transfer model is obtained by minimizing a loss function, the loss function is determined by the original loss function the background loss function and the foreground loss function; determining the training data based on the transferred image. The difference between the generated training data and the target image is small, thereby improving the accuracy of the training model obtained by using the training data.

19 Claims, 4 Drawing Sheets

(51) Int. Cl.
*G06N 3/04* (2006.01)
*G06V 10/28* (2022.01)

(56) References Cited

U.S. PATENT DOCUMENTS

| | | | | |
|---|---|---|---|---|
| 10,467,820 | B2* | 11/2019 | Mordvintsev | G06K 9/00214 |
| 10,579,908 | B2* | 3/2020 | Chen | G06T 5/00 |
| 10,592,386 | B2* | 3/2020 | Walters | G06F 30/20 |
| 10,691,975 | B2* | 6/2020 | Bagherinezhad | G06K 9/6255 |
| 10,776,626 | B1* | 9/2020 | Lin | G06K 9/6253 |
| 11,210,477 | B2* | 12/2021 | Srinivasan | G06F 40/44 |
| 2019/0385086 | A1* | 12/2019 | Wang | G06K 9/6232 |
| 2021/0004690 | A1* | 1/2021 | Chaudhary | G06N 3/08 |
| 2021/0142150 | A1* | 5/2021 | Zhang | G06N 3/08 |
| 2021/0209788 | A1* | 7/2021 | Kim | G06T 7/70 |

* cited by examiner

METHOD, DEVICE AND TERMINAL FOR GENERATING TRAINING DATA

CROSS-REFERENCE TO RELATED APPLICATION

This application claims the priority benefit of Chinese Patent Application No. 201910088005.7 filed on Jan. 29, 2019, the entire contents of which are hereby incorporated by reference.

FIELD OF TECHNOLOGY

The following relates to the field of image processing, and in particular, to a method, a device and a terminal for generating training data.

BACKGROUND

With the development of artificial intelligence technology, intelligent container systems capable of automatically identifying goods have emerged. The intelligent container system captures images of goods in its container through one or more cameras provided in the container, and transmits the captured images of the goods to a server end. The identification algorithm of the server end identifies and calculates the types and quantities of the goods in the container in real time.

The automatic identification of goods is realized by visual identification technology based on deep learning. The accurate identification based on deep learning technology requires a large amount of training data sets to be included for support, wherein the more the data for training is contained in the training data set, the more accurate the training results would be. At present, the data sets for goods identification are usually obtained by taking photos manually, for example, by taking pictures including the container and the items, after manually adjusting the position and angle of items on the container. Due to the large variety and the unlimited number of items, the angles for positioning items and the occlusion among items, it is very difficult to manually collect sample images, and the amount of sample data collected is limited. In order to solve the problem of insufficient sample data in the training data set, data synthetization is adopted for obtaining the sample data, that is, the sample data is generated by machine.

The inventor found that at least the following problems exist in conventional art: while forming the training data set by synthesized sample data greatly increases the number of sample data in the training data set, the synthesized sample data is often quite different from the sample data collected in real, thus a model trained with the synthesized sample data is inaccurate, thereby reducing the item identification capability.

SUMMARY

An aspect relates to a method, a device and a terminal for generating training data and a terminal, enabling a small difference between the generated training data and a target image, thus enhancing accuracy of the training model obtained with the training data.

To solve the above technical problem, an embodiment of the present disclosure provides a method for generating training data, including: obtaining an original image; determining a transferred image according to an image style transfer model and the original image, the image style transfer model being obtained by minimizing a loss function, the loss function being determined according to an original loss function, a background loss function, and a foreground loss function; and determining the training data according to the transferred image; wherein, the original loss function is configured to indicate a degree of difference between the transferred image and a target image, and the background loss function is configured to indicate a degree of difference between a background image in the transferred image and a background image in the target image, the foreground loss function is configured to indicate a degree of difference between a foreground image in the transferred image and a foreground image in the target image.

An embodiment of the present disclosure further provides a device for generating training data, including: an obtaining module, a first determining module, and a second determining module; wherein the obtaining module is configured to obtain an original image; the first determining module is configured to determine a transferred image according to an image style transfer model and an original image, the image style transfer model is obtained by minimizing a loss function, and the loss function is determined according to an original loss function, a background loss function, and a foreground loss function; the second determining module is configured to determine the training data according to the transferred image; wherein, the original loss function is configured to indicate a degree of difference between the transferred image and a target image, the background loss function is configured to indicate a degree of difference between a background image in the transferred image and a background image in the target image, and the foreground loss function is configured to indicate a degree of difference between a foreground image in the transferred image and a foreground image in the target image.

An embodiment of the invention further proposes a terminal, including: at least one processor; and a memory communicatively connected with the at least one processor; wherein, the memory stores instructions executable by the at least one processor, and when being executed by the at least one processor, the instructions enable the at least one processor to execute the method for generating training data described above.

Compared with conventional art, in the embodiments of the present disclosure, the image style transfer model is determined by minimizing the loss function, that is, the more accurate the determined loss function is, the closer the transferred image determined by the image style transfer model is to the target image. Generally, an image includes the foreground image and the background image, and if the items in the foreground image or the background image are in a jumble, an inaccurate loss function is often obtained when determining the loss function. In this embodiment, the foreground loss function and background loss function are determined respectively, and the loss function is determined collectively by the foreground loss function, the background loss function and the original loss function, thus avoiding influence of the foreground image to the background image or influence of the background image to the foreground image, thereby greatly improving accuracy of the determined loss function. Since the difference between the target image and the transferred image determined from the image style transfer model and the original image is small, the accuracy of the training data determined based on the transfer data is improved, and thus the accuracy of the training model obtained with the training data is improved.

Further, the method for generating training data further includes performing the following step before obtaining the original image: obtaining a first image set and a second image set, wherein first images in the first image set have the same image style as that of the original image, and second images in the second image set have the same image style as that of the transferred image; determining the original loss function, the background loss function and the foreground loss function respectively according to the first image set and the second image set; and minimizing the loss function determined by the original loss function, the background loss function and the foreground loss function, so as to construct the image style transfer model. Before obtaining the original image, training is performed by using a large number of the first images and the second images to determine the original loss function, background loss function and foreground loss function, thereby constructing an accurate image style transfer model.

Furthermore, the step of determining the original loss function, the background loss function, and the foreground loss function respectively according to the first image set and the second image set includes: segmenting each of the first images in the first image set into a first foreground image and a first background image, and segmenting each of the second images in the second image set into a second foreground image and a second background image; determining the original loss function according to each of the first images and each of the second images; determining the foreground loss function according to each of the first foreground images and each of the second foreground images; and determining the background loss function according to each of the first background images and each of the second background images. By segmenting each of the first images and each of the second images, the foreground loss function and the background loss function may be determined quickly and accurately.

Further, after obtaining the original image and before determining the transferred image, the method for generating training data further includes: converting the original image into an image composed based on hue, saturation, and value, if it is determined that the original image is not an image composed based on hue, saturation, and value. The image based on hue, saturation and value has low sensitivity to colors, and image transferring is an operation for transferring the image style, which requires to ensure that the colors are unchanged or changed little, thus it may greatly improve the accuracy of transferring images by converting the original image into an image based on hue, saturation, and value.

Further, the step of determining the foreground loss function according to each of the first foreground images and each of the second foreground images specifically includes: according to each of the first foreground images and each of the second foreground images, calculating a first expectation function for converting an image style to which the first foreground image belongs into an image style to which the second foreground image belongs, and calculating a second expectation function for converting the image style to which the second foreground image belongs into the image style to which the first foreground image belongs; and taking a sum of the first expectation function and the second expectation function as the foreground loss function. The foreground loss function is determined according to the first expectation function and the second expectation function, such that a flexible conversion between the image style to which the first foreground image belongs and the image style to which the second foreground image belongs is achieved by the foreground loss function.

Further, the step of determining the background loss function according to each of the first background images and each of the second background images includes: according to each of the first background images and each of the second background images, calculating a third expectation function for converting an image style to which the first background image belongs into an image style to which the second background image belongs, and calculating a fourth expectation function for converting the image style to which the second background image belongs into the image style to which the first background image belongs; and taking a sum of the third expectation function and the fourth expectation function as the background loss function. The background loss function is determined according to the third expectation function and the fourth expectation function, such that a flexible conversion between the image style to which the first background image belongs and the image style to which the second background image belongs is achieved by the background loss function.

Furthermore, the step of determining the training data according to the transferred image specifically includes: converting the transferred image based on hue, saturation, and value back to an image based on three primary colors; and taking the transferred image obtained after the conversion as the training data. This ensures the stability of colors in the transferred image.

BRIEF DESCRIPTION

Some of the embodiments will be described in detail, with references to the following Figures, wherein like designations denote like members, wherein.

DETAILED DESCRIPTION

In order to make the objectives, technical solutions, and advantages of the embodiments of the present disclosure clearer, the embodiments of the present disclosure will be explained in detail with reference to the accompanying drawings. However, a person of ordinary skill in the art could understand that, in various embodiments of the present disclosure, many technical details are provided for the reader to better understand the present application. However, the technical solution claimed in this application can be implemented without these technical details and various changes and modifications based on the following embodiments.

Figure 1:
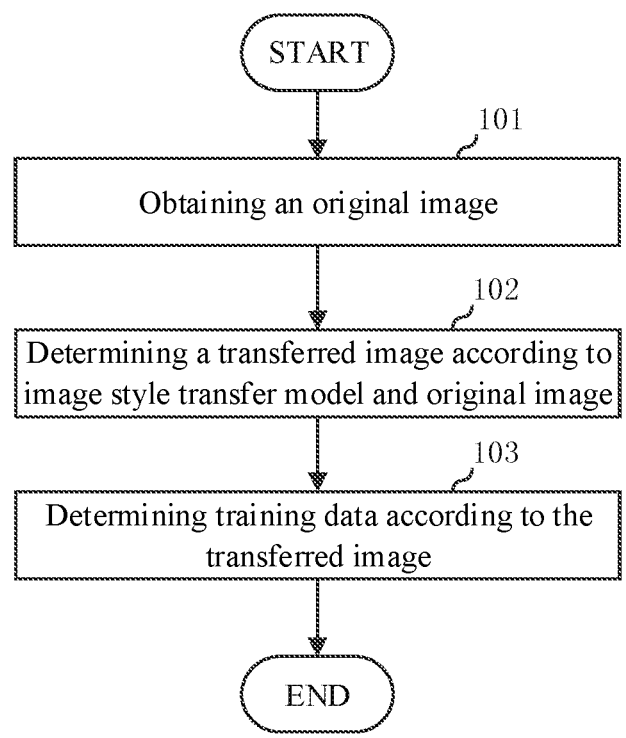
FIG. 1 is a schematic flowchart of a method for generating training data according to a first embodiment of the present disclosure.

A first embodiment of the present disclosure relates to a method for generating training data. The method for generating training data is applied to a terminal having a calculation function. The generated training data may be used for training an object identification model. For example, a large amount of training data comprising a container and goods in the container is used to train a goods identification model. The specific flow of the method for generating the training data is shown in FIG. 1.

Step 101: Obtaining an original image

Specifically, the original image may be obtained through an input. The original image may be a composite image. The composite image may be obtained through a 3D model that completely simulates a real object. For example, by simulating a 3D image for the container and a 3D image for the goods in the container, combining the simulated 3D images and then rendering the combined image by a virtual camera, a composite image for the container placed with the goods is obtained; or by simulating a 3D image for the goods in the container, combining the simulated 3D image with a real 2D background image and re-rendering the combined image by a virtual camera, the composite image may also be obtained. Since the composite image does not need to be manually collected, composite images of different styles may be generated by adjusting an angle for simulating the 3D images for the goods, distortion degree of the camera and illumination intensity within the container, so as to meet requirements for training the goods identification model.

It shall be understood that the original image may also be a real image, for example, images of the container and the goods in the container taken in a real environment.

Step 102: Determining a transferred image according to an image style transfer model and the original image. The image style transfer model is obtained by minimizing a loss function, and the loss function is determined according to an original loss function, a background loss function, and a foreground loss function.

Specifically, the image style transfer model is configured to convert images of different image styles. For example, the image style transfer model may convert an image of oil painting style into an image of camera image style, or convert an image of camera image style into an image of oil painting style. The image style transfer model is obtained by minimizing the loss function, and the loss function is determined according to the original loss function, the background loss function and the foreground loss function. The original loss function is configured to indicate the degree of difference between the transferred image and a target image. The background loss function is configured to indicate the degree of difference between the background image in the transferred image and the background image in the target image. The foreground loss function is configured to indicate the degree of difference between the foreground image in the transferred image and the foreground image in the target image.

Specifically, it may be understood that the target image may be a real image having the same image style as that of the transferred image; and the transferred image is determined according to the image style transfer model. That is to say, the transferred image may be understood as a predicted image determined based on the image style transfer model and the original image, and the target image may be understood as a real image. Therefore, the original loss function may be configured to indicate the degree of difference between the predicted image and the real image in its entirety. An image includes a foreground image and a background image, taking an image captured within the container as an example, the foreground image is an image for goods in the container, and the background image is an image for the container. Similarly, the background loss function may indicate the degree of difference between a predicted image representing the background and the real background image, and the foreground loss function may indicate the degree of difference between a predicted image representing the foreground and the real foreground image.

Each time an original image is obtained, a transferred image of another image style may be determined according to the image style transfer model.

Step 103: Determining training data according to the transferred image.

Specifically, the transferred image may be directly used as training data.

Figure 2:
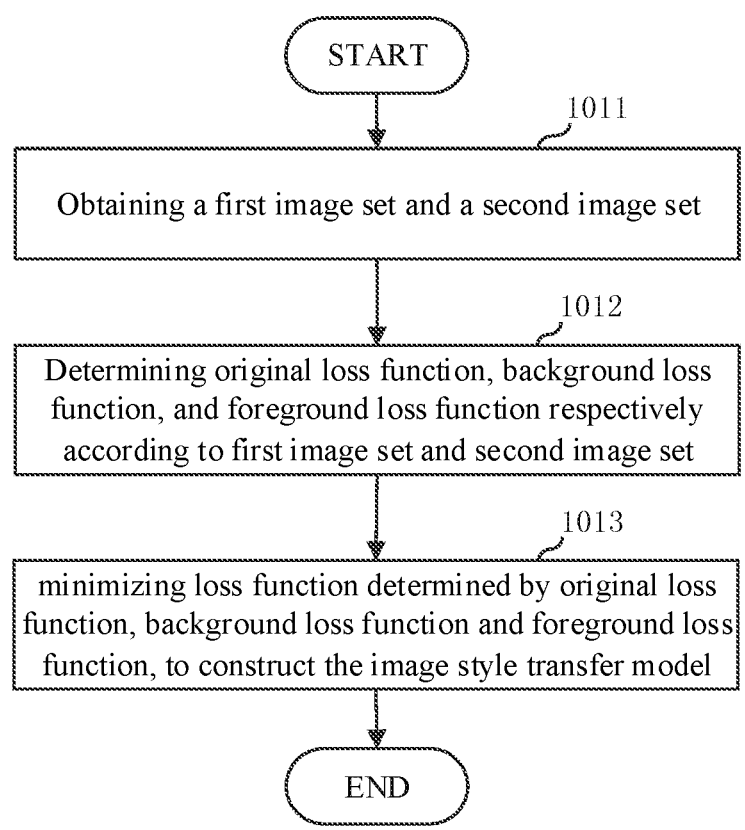
FIG. 2 is a schematic flowchart for constructing an image style transfer model according to the first embodiment of the present disclosure.

It should be understood that before obtaining the original image in step 101, the image style transfer model needs to be constructed, and the image style transfer model may be constructed by using the sub-steps shown in FIG. 2.

Step 1011: Obtaining a first image set and a second image set. The first images in the first image set have the same image style as that of the original image, and the second images in the second image set have the same image style as that of the transferred image.

Specifically, the first image set needs to include a large number of first images, and the second image set needs to include a large number of second images. It is only necessary to ensure that the image style of each of the first images is different from the image style of each of the second images. The first images and the second images do not have to have a one-to-one correspondence therebetween, that is, the first images in the first image set do not have to be paired with the second images in the second image set. For example, the first image is an image for an orange of a color oil painting style, and the second image may be an image for a pear captured by a camera.

It should be noted that in the process of constructing the image style transfer model, each of the first images in the first image set may be an image based on hue, saturation, and value, thereby reducing the color sensitivity in the model construction process and improving accuracy of the constructed model.

Step 1012: Determining the original loss function, the background loss function, and the foreground loss function respectively according to the first image set and the second image set.

In a specific implementation, each of the first images in the first image set is segmented into a first foreground image and a first background image, and each of the second images in the second image set is segmented into a second foreground image and a second background image; the original loss function is determined according to each of the first images and each of the second images; the foreground loss function is determined according to each of the first foreground images and each of the second foreground images; the background loss function is determined according to each of the first background images and each of the second background images.

Specifically, in the process of constructing the image style transfer model, each of the first images and the second image is segmented. If the image is a composite image, it may be segmented directly; if the image is a real image, firstly, objects belonging to the foreground in the image is circled with a foreground labelling box, and the image belonging to the background is circled with a background labelling box, thus the image may be segmented according to different labelling boxes. Segmentation for the real image may also be performed by using other methods, which will not be repeated herein.

The image style transfer model is a cyclic generative adversarial network model, the original loss function is determined based on each of the first images and each of the second images, that is, the original loss function is determined based on the complete first images and the complete second images. The original loss function for the image style transfer model is defined as in the following formula (1):

$$L_{style}=L_{GAN}(G,D_Y,X,Y)+L_{GAN}(F,D_X,X,Y)+\lambda_1 L_{cyc}(G,F) \quad \text{formula(1);}$$

Where, $L_{style}$ represents the original loss function, X represents the first image set, Y represents the second image set, G represents the image style mapping function from X to Y, F represents the image style mapping function from Y to X, and $D_X$ represents a discriminator for the image style to which the first image belongs, and $D_Y$ represents a discriminator for the image style to which the second image belongs. $L_{GAN}$ represents the standard adversarial loss, $L_{cyc}$ represents the cyclic consistency loss, and $\lambda_1$ represents the parameter indicating the trade-off among the three losses.

In a specific implementation, the process for determining the foreground loss function may be as follows: according to each of the first foreground images and each of the second foreground images, calculating a first expectation function for converting the image style to which the first foreground image belongs into the image style to which the second foreground image belongs, and a second expectation function for converting an image style to which the second foreground image belongs into an image style to which the first foreground image belongs; and taking a sum of the first expectation function and the second expectation function as the foreground loss function.

Specifically, the foreground loss function can be expressed by the following formula (2):

$$L_{FG} = E_{x \sim pdata(x)}[\|(G(x)_H - x_H) \odot M_{FG}(x)\|_2] + \quad \text{formula(2)}$$
$$E_{y \sim pdata(y)}[\|(F(y)_H - y_H) \odot M_{FG}(y)\|_2]$$

In the formula (2), x~pdata (x) represents a data distribution of X, y~pdata (y) represents a data distribution of Y, $M_{FG}(x)$ represents the foreground images of all objects in the first image x, and $M_{FG}(y)$ represents the foreground images of all objects in the second image y, "⊙" is the product of tensors; H represents that the application is on the Hue channel. That is, the first item in the formula (2) represents the first expectation function, and the second item represents the second expectation function.

In a specific implementation, the process for determining the background loss function may be as follows: according to each of the first background images and each of the second background images, calculating a third expectation function for converting the image style to which the first background image belongs into the image style to which the second background image belongs, and a fourth expectation function for converting the image style to which the second background image belongs into the image style to which the first background image belongs; and taking the sum of the third expectation function and the fourth expectation function as the background loss function.

Specifically, the background loss function may be expressed by the following formula (3):

$$L_{BG} = E_{x \sim pdata(x)}[\|(G(x)_H - x_H) \odot M_{BG}(x)\|_2] + \quad \text{formula(3)}$$
$$E_{y \sim pdata(y)}[\|(F(y)_H - y_H) \odot M_{BG}(y)\|_2]$$

In the formula (3), x~pdata (x) represents the data distribution of X, y~pdata (y) represents the data distribution of Y, $M_{BG}(x)$ represents the background image of all objects in the first image x, and $M_{BG}(y)$ represents the background image of all objects in the second image y, "⊙" represents the product of tensors, where H represents the application on the Hue channel; that is, the first item in the formula (3) represents the third expectation function, and the second item represents the fourth expectation function.

Step 1013: Minimizing the loss function determined by the original loss function, the background loss function and the foreground loss function, and constructing the image style transfer model.

Specifically, the image style transfer model is determined by the original loss function, the background loss function and the foreground loss function (that is, it can be determined according to formula (1), formula (2) and formula (3)), then the loss function may be represented by the following formula (4):

$$L_{OD}=L_{style}+\lambda_2 L_{FG}+\lambda_3 L_{BG} \quad \text{formula (4)}$$

Where, $L_{OD}$ represents the loss function of the image style transfer model, and λ2 and λ3 represent the trade-off parameters indicating trade-off among the loss functions. It can be understood that the specific values of $\lambda_1$, $\lambda_2$, and λ3 may be set according to actual training. For example, $\lambda_1$, $\lambda_2$, and $\lambda_3$ may be set to 10, 3, and 7, respectively.

It is worth mentioning that, when adopting a cyclic generative adversarial network model, the image information of the model can be set according to the practical application. For example, the image resolution in the image style transfer model may be set to 1000*1000. In addition, after the image style is transferred, the transfer-mage should contain key information in the original image, such as color information, contour information of each item in the original image, and so on.

Compared with conventional art, in the embodiments of the present disclosure, the image style transfer model is determined by minimizing the loss function, that is, the more accurate the determined loss function is, the closer the transferred image determined by the image style transfer model is to the target image. Generally, an image includes the foreground image and the background image, and if the items in the foreground image or the background image are in a jumble, an inaccurate loss function is often obtained when determining the loss function. In this embodiment, the foreground loss function and background loss function are determined respectively, and the loss function is determined collectively by the foreground loss function, the background loss function and the original loss function, thus avoiding influence of the foreground image to the background image or influence of the background image to the foreground image, thereby greatly improving accuracy of the determined loss function. Since the difference between the target image and the transferred image determined from the image style transfer model and the original image is small, the accuracy of the training data determined based on the transfer data is improved, and thus the accuracy of the training model obtained with the training data is improved.

Figure 3:
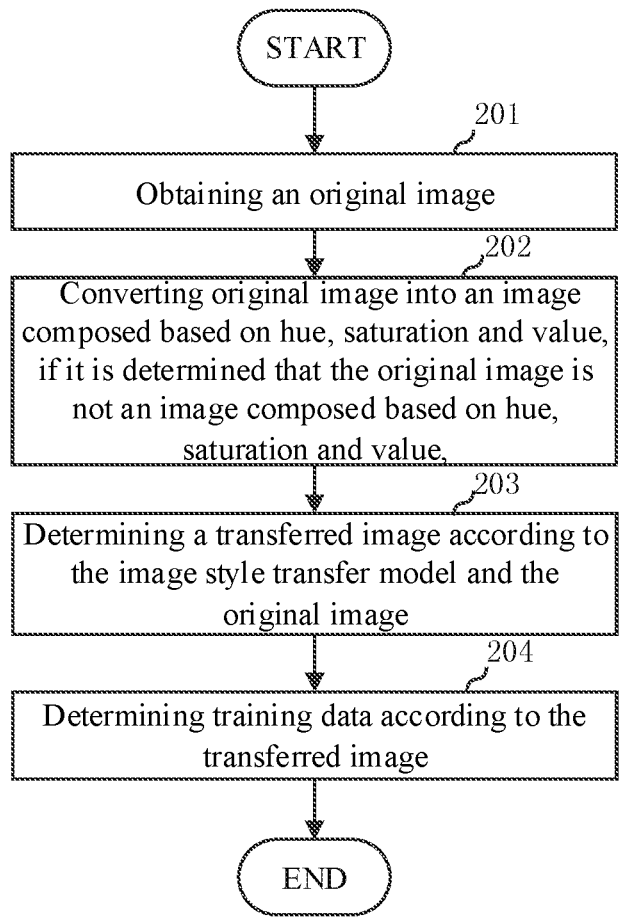
FIG. 3 is a schematic flowchart of a method for generating training data according to a second embodiment of the present disclosure.

A second embodiment of the present disclosure relates to a method for generating training data. The second embodiment relates to a further improvement to the first embodiment, the main improvement lies in that in the second embodiment of the present disclosure, after obtaining the original image and before determining the transferred image, a conversion is performed on the original image if it is determined that the original image is not composed based on hue, saturation, and value. The specific flow of the method for generating the training data is shown in FIG. 3.

Step 201: Obtaining an original image.

Step 202: If it is determined that the original image is not an image composed based on hue, saturation, and value, converting the original image into an image based on hue, saturation, and value.

Specifically, an image composed based on hue, saturation, and value is an image in the color space of hue, saturation, and value (or "HSV"); and an image based on three primary colors is generally an image in the RGB color space. Since the images based on the RGB color space are very sensitive to color changes, in order to determine that the transferred image determined according to the original image can retain the colors in the original image, it is necessary to first determine whether the original image is in the HSV color space. If it is not in the HSV color space, the original image is converted into an image based on the HSV color space. It is needless to say that if the original image is based on the HSV color space, there is no need to convert the color space of the original image.

In other words, the original image is not limited by the color space. When the original image is not in the HSV color space, upon converting the color space, transfer of image style is possible.

Step 203: Determining the transferred image according to the image style transfer model and the original image. The image style transfer model is obtained by minimizing a loss function, and the loss function is determined according to the original loss function, the background loss function and the foreground loss function.

Step 204: Determining training data according to the transferred image.

Specifically, if it is determined that the original image is not an image composed based on hue, saturation, and value, then, upon determining the transferred image, the transferred image needs to be converted back to an image based on the three primary colors, that is, the transferred image is converted from the HSV color space back into RGB color space, and this transferred image obtained after the conversion is taken as the final training data.

It should be noted that steps 201, 203, and 204 in this embodiment are substantially the same as steps 101, 102, and 103 in the first embodiment, and details are not described herein again.

According to the method for generating training data in this embodiment, through determining the color space to which the original image belongs, even if the original image is not an image based on the HSV color space, the transfer of image style is implementable by converting the original image into an image based on HSV color space, thus enhancing flexibility of obtaining the training data.

The steps shown in the above method are merely for clarity of description, and while implemented they can be combined into one step or some steps may be divided by segmenting into multiple steps, all of which are within the scope of protection of embodiments of the invention, as long as the variant includes the same logical relationship. Any modification where insignificant amendments are added to the algorithms or flows or insignificant designs are introduced into the algorithms or flows, without changing the core designs of the algorithms and flows, is within the scope of protection of embodiments of the invention.

Figure 4:
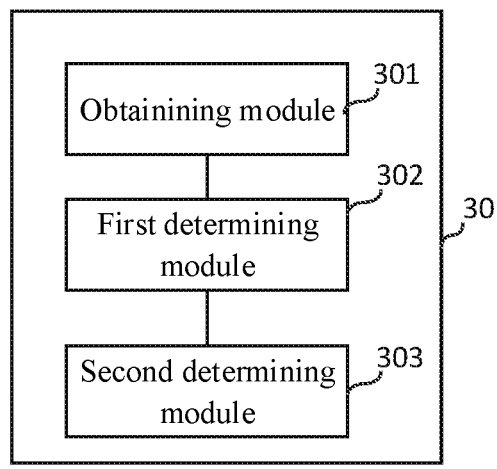
FIG. 4 is a schematic diagram illustrating a specific structure of a device for generating training data according to a third embodiment of the present disclosure.

The third embodiment of the present disclosure relates to a device for generating training data. The device 30 for generating training data includes: an obtaining module 301, a first determining module 302, and a second determining module 303. The specific structure of the device for generating training data is shown in FIG. 4.

The obtaining module 301 is configured to obtain the original image; the first determining module 302 is configured to determine the transferred image according to a image style transfer model and the original image, where the image style transfer model is obtained by minimizing to loss function, and the loss function is determined based on an original loss function and a background loss function and a foreground loss function; the second determining module 303 is configured to determine the training data according to the transferred image; wherein the original loss function is configured to indicate the degree of difference between the transferred image and the target image, and the background loss function is configured to indicate the degree of difference between the background image in the transferred image and the background image in the target image, and the foreground loss function is configured to indicate the degree of difference between the foreground image in the transferred image and the foreground image in the target image.

It is readily found that this embodiment is a device embodiment corresponding to the first embodiment, and it can be implemented in cooperation with the first embodiment. The related technical details mentioned in the first embodiment are still valid in this embodiment, and will not be repeated for reduction of duplication. Accordingly, the related technical details mentioned in this embodiment may also be applied in the first embodiment.

It is worth mentioning that each module involved in this embodiment is a logic module. In practical applications, a logical unit may be a physical unit, or a part of a physical unit, and may also be implemented as a combination of multiple physical units. In addition, in order to highlight the innovative part of the present disclosure, units that are not closely related to solving the technical problem proposed by the present disclosure are not introduced in this embodiment, but this does not mean that there are no other units in this embodiment.

Figure 5:
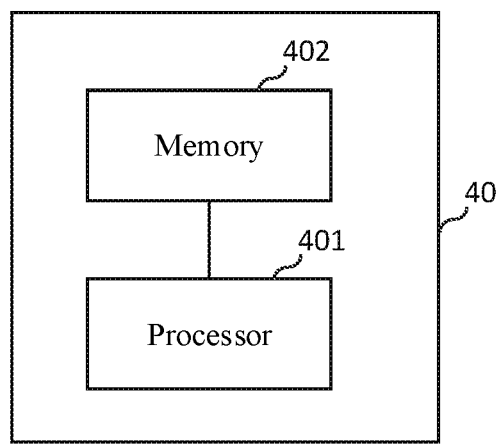
FIG. 5 is a schematic diagram illustrating a specific structure of a terminal according to a fourth embodiment of the present disclosure.

The fourth embodiment of the present disclosure relates to a terminal. The specific structure of the terminal 40 is shown in FIG. 5, including: at least one processor 401; and a memory 402 communicatively connected to the at least one processor; wherein the memory is stored with instructions thereon and the instructions may be executed by at least one processor, and when being executed by at least one processor, the instructions enable the at least one processor to perform the method for generating training data in the first embodiment or the second embodiment.

The memory 402 and the processor 401 are connected with a bus. The bus may include any number of interconnected buses and bridges. The bus connects various circuits of one or more processors 401 and the memory 402 together. The bus may also connect various other circuits such as peripherals, voltage regulators, and power management circuits together, which are well known in the art, so the description thereof are omitted herein. The bus interface provides an interface between the bus and a transceiver. The transceiver may be a single component or multiple components, such as multiple receivers and transmitters, which provides a unit for communicating with various other devices over a transmission medium. The data processed by the processor 401 is transmitted on a wireless medium through an antenna. Further, the antenna also receives data and transmits the data to the processor 401.

The processor 401 is responsible for managing the bus and general processing, and can also provide various functions, including timing, peripheral interfaces, voltage regulation, power management, and other control functions. The memory 402 may be configured to store data used by the processor 401 when performing operations.

Those skilled in the art can understand that all or part of the steps in the method of the above embodiments may be implemented by a program instructing related hardware. The program is stored in a storage medium and includes several instructions to enable a device (which can be a single-chip computer, Chip, etc.) or a processor to execute all or part of the steps of the method described in each embodiment of the present application. The foregoing storage medium includes: U disks, mobile hard disks, Read-Only Memory (ROM), Random Access Memory (RAM), magnetic disks, or optical disks and other media that can store program codes.

A person of ordinary skill in the art can understand that the foregoing embodiments are specific embodiments for implementing the present disclosure, and in practical applications, various changes can be made in form and details without departing from the spirit and scope of embodiments of the invention.

What is claimed is:

1. A method for generating training data, comprising:
obtaining an original image;
determining a transferred image according to an image style transfer model and the original image, wherein the image style transfer model is obtained by minimizing a loss function, and the loss function is determined according to an original loss function, a background loss function, and a foreground loss function; and
determining the training data according to the transferred image;
wherein, the original loss function is configured to indicate a degree of difference between the transferred image and a target image, and the background loss function is configured to indicate a degree of difference between a background image in the transferred image and a background image in the target image, the foreground loss function is configured to indicate a degree of difference between a foreground image in the transferred image and a foreground image in the target image.

2. The method for generating training data according to claim 1, further comprising performing the following steps before obtaining the original image:
obtaining a first image set and a second image set, wherein first images in the first image set have a same image style as that of the original image, and second images in the second image set have a same image style as that of the transferred image;
determining the original loss function, the background loss function and the foreground loss function respectively according to the first image set and the second image set; and
minimizing the loss function determined by the original loss function, the background loss function and the foreground loss function, so as to construct the image style transfer model.

3. The method for generating training data according to claim 2, wherein the determining the original loss function, the background loss function and the foreground loss function respectively according to the first image set and the second image set comprises:
segmenting each of the first images in the first image set into a first foreground image and a first background image, and segmenting each of the second images in the second image set into a second foreground image and a second background image;
determining the original loss function according to each of the first images and each of the second images;
determining the foreground loss function according to each of the first foreground images and each of the second foreground images; and
determining the background loss function according to each of the first background images and each of the second background images.

4. The method for generating training data according to claim 3, further comprising performing the following step after obtaining the original image and before determining the transferred image:
converting the original image into an image composed based on hue, saturation, and value, if it is determined that the original image is not an image composed based on hue, saturation, and value.

5. The method for generating training data according to claim 4, wherein, the determining the training data according to the transferred image comprises:
converting the transferred image based on hue, saturation, and value back to an image based on three primary colors; and
taking the transferred image obtained after the conversion as the training data.

6. The method for generating training data according to claim 3, wherein, the determining the foreground loss function according to each of the first foreground images and each of the second foreground images comprises:
according to each of the first foreground images and each of the second foreground images, calculating a first expectation function for converting an image style to which the first foreground image belongs into an image style to which the second foreground image belongs, and calculating a second expectation function for converting the image style to which the second foreground image belongs into the image style to which the first foreground image belongs; and
taking a sum of the first expectation function and the second expectation function as the foreground loss function.

7. The method for generating training data according to claim 6, wherein, the image style transfer model is a cyclic generative adversarial network model.

8. The method for generating training data according to claim 3, wherein, the determining the background loss function according to each of the first background images and each of the second background images comprises:
according to each of the first background images and each of the second background images, calculating a third expectation function for converting an image style to which the first background image belongs into an image style to which the second background image belongs, and calculating a fourth expectation function for converting the image style to which the second background image belongs into the image style to which the first background image belongs; and
taking a sum of the third expectation function and the fourth expectation function as the background loss function.

9. The method for generating training data according to claim 8, wherein, the image style transfer model is a cyclic generative adversarial network model.

10. A non-transitory computer readable medium having stored thereon a computer program, when being executed by a processor, the program implementing the method for generating training data according to claim 1.

11. A terminal for generating training data, comprising:
at least one processor; and
a memory communicatively connected with the at least one processor;
wherein, the memory stores instructions executable by the at least one processor, and when being executed by the at least one processor, the instructions enable the at least one processor to implement a method comprising:
obtaining an original image;
determining a transferred image according to an image style transfer model and the original image, wherein, the image style transfer model is obtained by minimizing a loss function, and the loss function is determined according to an original loss function, a background loss function and a foreground loss function; and
determining the training data according to the transferred image;
wherein, the original loss function is configured to indicate a degree of difference between the transferred image and a target image, and the background loss function is configured to indicate a degree of difference between a background image in the transferred image and a background image in the target image, the foreground loss function is configured to indicate a degree of difference between a foreground image in the transferred image and a foreground image in the target image.

12. The terminal according to claim 11, wherein, the instructions enable the at least one processor to further implement the following steps before obtaining the original image:
obtaining a first image set and a second image set, wherein first images in the first image set have a same image style as that of the original image, and second images in the second image set have a same image style as the transferred image;
determining the original loss function, the background loss function and the foreground loss function respectively according to the first image set and the second image set; and
minimizing the loss function determined by the original loss function, the background loss function and the foreground loss function, so as to construct the image style transfer model.

13. The terminal according to claim 12, wherein, the determining the original loss function, the background loss function and the foreground loss function respectively according to the first image set and the second image set comprises:
segmenting each of the first images in the first image set into a first foreground image and a first background image, and segmenting each of the second images in the second image set into a second foreground image and a second background image;
determining the original loss function according to each of the first images and each of the second images;
determining the foreground loss function according to each of the first foreground images and each of the second foreground images; and
determining the background loss function according to each of the first background images and each of the second background images.

14. The terminal according to claim 13, wherein, the instructions enable the at least one processor to further implement the following step after obtaining the original image and before determining the transferred image:
converting the original image into an image composed based on hue, saturation, and value, if it is determined that the original image is not an image composed based on hue, saturation, and value.

15. The terminal according to claim 13, wherein, the determining the foreground loss function according to each of the first foreground images and each of the second foreground images comprises:
according to each of the first foreground images and each of the second foreground images, calculating a first expectation function for converting an image style to which the first foreground image belongs into an image style to which the second foreground image belongs, and calculating a second expectation function for converting the image style to which the second foreground image belongs into the image style to which the first foreground image belongs; and
taking a sum of the first expectation function and the second expectation function as the foreground loss function.

16. The terminal according to claim 13, wherein, the determining the background loss function according to each of the first background images and each of the second background images comprises:
according to each of the first background images and each of the second background images, calculating a third expectation function for converting an image style to which the first background image belongs into an image style to which the second background image belongs, and calculating a fourth expectation function for converting the image style to which the second background image belongs into the image style to which the first background image belongs; and
taking a sum of the third expectation function and the fourth expectation function as the background loss function.

17. The terminal according to claim 14, wherein, the determining the training data according to the transferred image comprises:
converting the transferred image based on hue, saturation, and value back to an image based on three primary colors;
taking the transferred image obtained after the conversion as the training data.

18. The terminal according to claim 15, wherein, the image style transfer model is a cyclic generative adversarial network model.

19. The terminal according to claim 16, wherein, the image style transfer model is a cyclic generative adversarial network model.

* * * * *